US011042634B2

(12) United States Patent
Mandal et al.

(10) Patent No.: US 11,042,634 B2
(45) Date of Patent: Jun. 22, 2021

(54) DETERMINING INFORMATION LEAKAGE OF COMPUTER-READABLE PROGRAMS

(71) Applicant: FUJITSU LIMITED, Kawasaki (JP)

(72) Inventors: Avradip Mandal, Sunnyvale, CA (US); Arnab Roy, Santa Clara, CA (US); Hart Montgomery, Redwood City, CA (US); John C. Mitchell, Stanford, CA (US)

(73) Assignee: FUJITSU LIMITED, Kawasaki (JP)

( * ) Notice: Subject to any disclaimer, the term of this patent is extended or adjusted under 35 U.S.C. 154(b) by 89 days.

(21) Appl. No.: 16/231,031

(22) Filed: Dec. 21, 2018

(65) Prior Publication Data
US 2020/0201991 A1 Jun. 25, 2020

(51) Int. Cl.
| G06F 21/55 | (2013.01) |
| G06F 8/75 | (2018.01) |
| G06F 21/14 | (2013.01) |
| G06F 21/54 | (2013.01) |
| H04L 9/00 | (2006.01) |

(52) U.S. Cl.
CPC .............. G06F 21/556 (2013.01); G06F 8/75 (2013.01); G06F 21/14 (2013.01); G06F 21/54 (2013.01); H04L 9/002 (2013.01); *H04L 2209/20* (2013.01)

(58) Field of Classification Search
CPC .......... G06F 21/556; G06F 8/75; G06F 21/14; G06F 21/54; H04L 9/002; H04L 2209/20
USPC ......................................................... 726/22
See application file for complete search history.

(56) References Cited

U.S. PATENT DOCUMENTS

| 9,858,440 | B1* | 1/2018 | Wang ...................... G06F 21/54 |
| 2003/0018608 | A1* | 1/2003 | Rice ...................... G06F 21/606 |
| 2013/0024942 | A1* | 1/2013 | Wiegenstein .......... G06Q 40/00 726/25 |
| 2016/0350329 | A1* | 12/2016 | Resch ................... G06F 3/0644 |
| 2017/0026342 | A1* | 1/2017 | Sidana ................... H04L 9/008 |
| 2017/0090919 | A1* | 3/2017 | Liu ........................... G06F 8/75 |
| 2017/0206350 | A1* | 7/2017 | Salajegheh ........... G06F 21/556 |

(Continued)

OTHER PUBLICATIONS

Xu, Yuanzhong, Weidong Cui, and Marcus Peinado. "Controlled-channel attacks: Deterministic side channels for untrusted operating systems." Security and Privacy (SP), 2015 IEEE Symposium on. IEEE, May 2015.

(Continued)

*Primary Examiner* — Badri Champakesan
(74) *Attorney, Agent, or Firm* — Maschoff Brennan

(57) ABSTRACT

According to an aspect of an embodiment, a method of determining information leakage of a computer-readable program may include obtaining a first component of the computer-readable program. The first component may have a first information leakage that may be unknown. The first component may be comprised of a second component and a third component. The method may also include obtaining a second information leakage of the second component. The method may also include obtaining a third information leakage of the third component. The method may also include determining a relationship between the second component and the third component relative to the first component. The method may also include determining the first information leakage based on the second information leakage, the third information leakage, and the relationship.

19 Claims, 7 Drawing Sheets

(56) References Cited

U.S. PATENT DOCUMENTS

| | | | |
|---|---|---|---|
| 2018/0046516 A1* | 2/2018 | Sharkey | G06F 9/50 |
| 2018/0248682 A1* | 8/2018 | Nguyen | H04L 9/002 |
| 2018/0349612 A1* | 12/2018 | Harel | G06F 21/54 |
| 2019/0042745 A1* | 2/2019 | Chen | G06F 21/552 |
| 2019/0087569 A1* | 3/2019 | Levin | G06F 21/562 |
| 2019/0156025 A1* | 5/2019 | Wallace | G06F 21/577 |
| 2019/0251257 A1* | 8/2019 | McKeen | G06F 12/1491 |
| 2019/0266322 A1* | 8/2019 | Jones | G06F 21/51 |
| 2019/0297092 A1* | 9/2019 | Shibahara | H04L 63/168 |
| 2019/0303564 A1* | 10/2019 | Kelly | G06F 21/577 |
| 2019/0311129 A1* | 10/2019 | Clifton | G06F 21/52 |
| 2019/0325131 A1* | 10/2019 | Prayaga | G06T 1/0021 |
| 2019/0384913 A1* | 12/2019 | Usui | G06F 21/52 |
| 2020/0065480 A1* | 2/2020 | Gu | G06F 21/64 |
| 2020/0089502 A1* | 3/2020 | Hong | G06F 21/75 |

OTHER PUBLICATIONS

Lee, Sangho, et al. "Inferring fine-grained control flow inside SGX enclaves with branch shadowing." arXiv preprint arXiv:1611.06952 (Aug. 17, 2016).

Weichbrodt, Nico, et al. "AsyncShock: Exploiting synchronisation bugs in Intel SGX enclaves." European Symposium on Research in Computer Security. Springer International Publishing, Sep. 15, 2016.

Ohrimenko, Olga, et al. "Oblivious multi-party machine learning on trusted processors." USENIX Security. vol. 16 Aug. 10, 2016.

Goldreich, Oded. "Towards a theory of software protection and simulation by oblivious RAMs." Proceedings of the nineteenth annual ACM symposium on Theory of computing. ACM, Jan. 1987.

Meyer, Albert R., and Dennis M. Ritchie. "The complexity of loop programs." Proceedings of the 1967 22nd national conference. ACM, May 15, 1967.

Chan, TH Hubert, et al. "Cache-oblivious and data-oblivious sorting and applications." Proceedings of the Twenty-Ninth Annual ACM-SIAM Symposium on Discrete Algorithms. Society for Industrial and Applied Mathematics, Jan. 7, 2018.

EP Search Report in Application No. 19210590.6 dated May 4, 2020.

Doychev et al., "Rigorous Analysis of Software Countermeasures against Cache Attacks", IMDEA Software Institute, Jun. 18, 2017.

Doychev et al., "CacheAudit: A Tool for the Static Analysis of Cache Side Channels", IMDEA Software Institute, Jun. 2015.

* cited by examiner

DETERMINING INFORMATION LEAKAGE OF COMPUTER-READABLE PROGRAMS

FIELD

The embodiments discussed in the present disclosure are related to determining information leakage of computer-readable programs.

BACKGROUND

Protecting sensitive information is a concern for many people and organizations. Some computer-readable programs operate on sensitive information and may expose the sensitive information.

The subject matter described in the present disclosure is not limited to embodiments that solve any disadvantages or that operate only in environments such as those described above. Rather, this background is only provided to illustrate one example technology area where some embodiments described in the present disclosure may be practiced.

SUMMARY

One embodiment of the present disclosure may include a method that includes obtaining a first component of a computer-readable program. The first component may have a first information leakage that may be unknown. The first component may be comprised of a second component and a third component. The method may also include obtaining a second information leakage of the second component. The method may also include obtaining a third information leakage of the third component. The method may also include determining a relationship between the second component and the third component relative to the first component. The method may also include determining the first information leakage based on the second information leakage, the third information leakage, and the relationship.

One or more of the objects and/or advantages of the embodiments will be realized or achieved at least by the elements, features, and combinations particularly pointed out in the claims.

It is to be understood that both the foregoing general description and the following detailed description are given as examples and explanatory and are not restrictive of the present disclosure, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Figure 1:
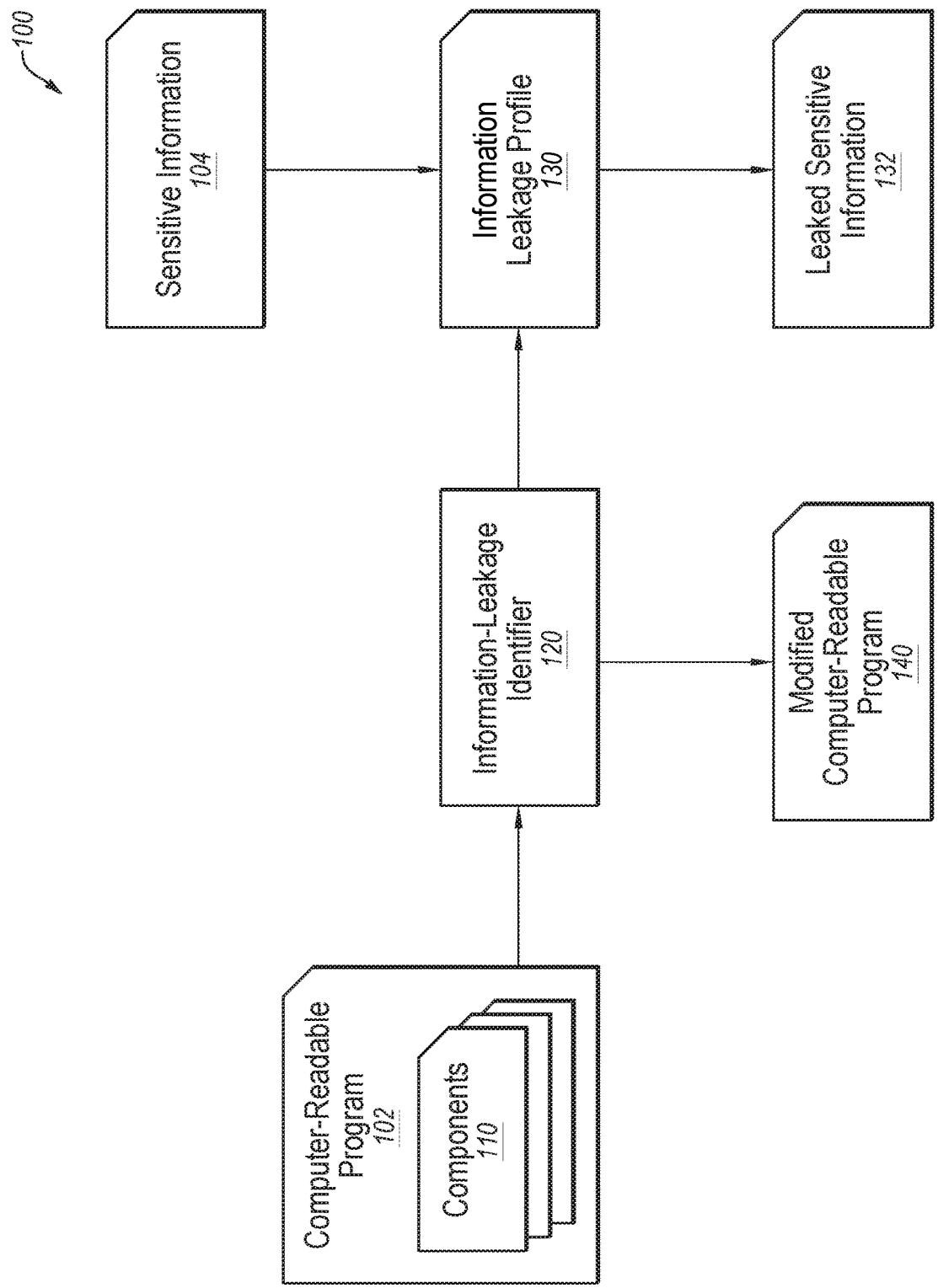
FIG. 1 is a block diagram of an example system for determining information leakage of computer-readable programs.

The present disclosure relates to determining information leakage of computer-readable programs. In the present disclosure, the term "information leakage" refers to information that may be determined by observing how a computer-readable program operates, for example, information that may be determined by observing memory access patterns. In the present disclosure, the terms "expose" or exposed" similarly describe the state of information that may be leaked by observing how the computer-readable program operates.

The present disclosure relates to determining the information leakage of an entire computer-readable program by determining the leakage of particular components of the computer-readable program, and their relationships. In the present disclosure, determining the information leakage of an entire computer-readable program from the information leakage of the components of the entire computer-readable program may be referred to as "composing information leakage." For example, the information leakage of the entire computer-readable program may be determined by obtaining an information leakage of two or more individual components of code of the computer-readable program, determining the relationship between the two or more components of code relative to the entire computer-readable program, and determining the leakage of the entire computer-readable program based on the information leakage of the two or more components individually, and the relationship between the two or more components and the entire computer-readable program. The relationship between the two or more components may include parallel composition, sequential composition, a conditional branch, and/or primitive recursion.

Such embodiments of the present disclosure improve the technical field of software development in specific ways. For example, embodiments of the present disclosure may be useful for analyzing, managing, and/or reducing information leakage of computer-readable programs.

For example, embodiments of the present disclosure may be used to determine an information leakage of a component of a computer-readable program. In response to the determination, one or more insecure lines of code of the component may be replaced with one or more secure lines of code. The replacement may be accomplished by a software developer and/or an automated software development tool. The replacement may reduce the information leakage of the computer-readable program. Thus, the embodiments of the present disclosure may improve the technical field of software development and/or data security by determining information leakage of a component of a computer-readable program so that exposure of sensitive information can be reduced by modifying the component. One or more such examples are described in greater detail below with reference to FIG. 2C.

As another example, in response to a determination of information leakage of a component, the component may be flagged as insecure to indicate that information accessed by the component may be at risk of exposure. This may alert a software developer, and/or an automated software development tool, to a risk of exposure. In response to the the flag, the software developer and/or the automated software development tool may modify the component and/or the way the component is used in the computer-readable program. Additionally or alternatively, the developer and/or the automated software development tool may determine what information to use in the component based on the flagging. For example, the developer may design the computer-readable program such that sensitive information is not accessed by the component. Thus, the embodiments of the present disclosure may improve the technical field of software development and/or data security by flagging a component of a computer readable-program as insecure so that exposure of sensitive information may be reduced by modifying the component, the computer-readable program, and/or modifying which information is accessed by the component.

As another example, in response to a determination that a computer-readable program does leak information, determining whether the leaked information is sensitive information when executing the program using sensitive information. Such a determination may be used as a basis for flagging the computer-readable program as approved or not approved for execution using sensitive information. Thus, the embodiments of the present disclosure may improve the technical field of software development and/or data security by flagging a computer readable-program as approved or not approved so that exposure of sensitive information can be reduced by preventing unapproved programs from accessing sensitive information.

As another example, a computer-readable program may be executed using particular information. In response to a determination of information leakage of a component, a determination may be made as to whether the particular information was exposed during the execution of the computer-readable program. Thus, the embodiments of the present disclosure may improve the technical field of software analysis, data forensics, and/or data security by determining whether particular information was leaked.

These embodiments of the present disclosure may have application to computer-readable programs executed in a trusted execution environment (TEE). For example, in a TEE an attacker may be able to observe which memory locations are accessed without being able to observe data stored at the accessed memory locations. Embodiments of the present disclosure may improve the data security of computer-readable programs that may be used in a TEE by modifying, and/or enabling the modification of the computer-readable programs to reduce information leakage.

Additionally, embodiments of the present disclosure may improve the functioning of a computer by allowing computer performance of functions not previously performed by a computer. For example, determining information leakage of a computer-readable program or one or more components thereof.

FIG. 1 is a block diagram of an example system 100 for determining information leakage of computer-readable programs; according to at least one embodiment described in the present disclosure. In general, an information-leakage identifier 120 may be configured to analyze a computer-readable program 102, and/or components 110 thereof. The information-leakage identifier 120 may be configured to generate an information-leakage profile 130. Additionally or alternatively, the information-leakage identifier 120 may be configured to generate a modified computer-readable program 140.

In some embodiments, the computer-readable program 102 may include any computer-readable program in any suitable format, such as human-readable code and/or machine-executable instructions. In some embodiments, the computer-readable program 102 may be configured, designed, and/or intended for operation inside a trusted execution environment. In these and other embodiments, the computer-readable program 102 may be designed to operate on, receive as inputs, or otherwise utilize or potentially expose sensitive information. The computer-readable program may be designed or used in a way that manages or reduces direct exposure of sensitive information. Nevertheless, the sensitive information may be exposed by the operations of the computer-readable program.

In some embodiments, the sensitive information 104 may include information that may be used during execution of the computer-readable program 102 in any suitable format, for example, extensible markup language (XML) or comma separated values (CSV). In some embodiments, the sensitive information 104 may be encrypted. The sensitive information 104 may include actual or simulated sensitive information including, for example, personally identifiable information, health information, and/or financial information. The sensitive information 104 may include information of varying degrees of sensitivity, for example, a particular person's social security number may be more sensitive than the particular person's address.

Additionally or alternatively, the sensitive information 104 may include simulated data or data designed for testing of the computer-readable program 102. The sensitive information 104 may include information associated with the computer-readable program 102, and/or the operation of the computer-readable program 102. In some embodiments the system 100 may operate without any sensitive information 104 and may generate the information-leakage profile 130, and/or the modified computer-readable program 140 without reference to any sensitive information 104.

In some embodiments, the components 110 may be one or more components of the computer-readable program 102 in any suitable format. The components 110 may include lines of code, functions, methods, and/or processor instructions. In some embodiments, the computer-readable program 102 may be divided into the components 110 such that all of the components 110 combine to from the computer-readable program 102.

In some embodiments, the information-leakage identifier 120 may be configured to analyze the computer-readable program 102, and/or one or more components 110 thereof to generate the information-leakage profile 130 and/or the modified computer-readable program 140. The information-leakage identifier 120 may or may not use the sensitive information 104 when analyzing the computer-readable program 102 and/or the components 110.

In some embodiments, the information-leakage identifier 120 may be configured to divide the computer-readable program 102 into the components 110. In some embodiments, the information-leakage identifier 120 may be configured to recursively divide the components 110 into smaller and smaller components 110 until they are at a size at which the leakage for each individual component is identifiable by the information-leakage identifier 120. The information-leakage identifier 120 may be configured to determine an information leakage of each of the smaller components 110. For example, the component 110 may be compared with another example portion of code that has a known information leakage. In these or other embodiments a software developer may determine a leakage of one or more of the smaller components.

For example, a certain component 110 may access certain blocks of memory in certain order such that even if the data is encrypted, the order in which the address blocks are accessed may expose information about the encrypted data. For example, if a component is configured to do a bit-by-bit comparison of passwords, and a first memory location is accessed for each mismatching bit, and a second memory location is accessed for each matching bit, the password may be leaked because the password may be able to be determined by observing which memory locations are accessed. As another example, a certain component may access a particular block of memory repeatedly. The duration of time spent operating on the particular block of memory or the number of times the particular block of memory is accessed may be visible to an attacker. If, for example, the particular block of memory is accessed once for each customer, this may expose the number of customers in a database.

In these and other embodiments, the information-leakage identifier 120 may be configured to aggregate the information leakage of each of the smaller components 110 to determine an information leakage of the entire computer-readable program 102. Additionally or alternatively, the information-leakage identifier 120 may be configured to determine information leakage of one or more of the smaller components 110 to determine the leakage of a component 110 that is less than the entire program 102.

How information leakages of components 110 aggregate to form information leakages of larger components, or entire computer readable programs 102 may be based on the relationships between the various components 110. The information-leakage identifier 120 may be configured to determine various relationships between various components 110 and aggregate the information leakages based on the various relationships. Examples of four relationships will be given below with regard to FIGS. 2A-2D. In some embodiments, the relationships between various components 110 may be determined by comparing the components 110 to common coding patterns. Additionally or alternatively, the computer-readable program may be parsed for certain keywords, etc. For example, the keywords "for" or "while" may indicate a primitive recursion relationship.

In some embodiments the information-leakage identifier 120 may be configured to determine information leakage of the computer-readable program 102 and/or one or more components 110 without relation to any particular information. In some embodiments, the information-leakage identifier 120 may be configured to determine information leakage of the computer-readable program 102, and/or one or more components 110, relative to sensitive information 104. For example, the information-leakage identifier 120 may be configured to determine which, if any, of the sensitive information 104 would be exposed during an execution of the computer-readable program 102 using the sensitive information 104. Additionally or alternatively, the information-leakage identifier 120 may be configured to determine whether sensitive information 104, or particular information of the sensitive information 104, was exposed during an execution of the computer-readable program 102 that has already occurred.

In some embodiments, the information-leakage identifier 120 may be configured to determine whether the information exposed by the computer-readable program 102 and/or one or more components 110 satisfy a safety threshold. For example, the safety threshold may be based on whether information is exposed without relation to any particular information. For another example, the safety threshold may be based on an amount of the sensitive information 104 that is exposed (e.g., 30% of the sensitive information 104 is exposed) and/or whether particular information of the sensitive information 104 is exposed (e.g., elements one and five of the sensitive information 104 is exposed). Based on whether the information exposed during execution of the computer-readable program 102, and/or the one or more components 110, satisfies the safety threshold, the information-leakage identifier 120 may be configured to flag the computer-readable program 102, and/or the one or more components 110, as either approved or not approved for execution using sensitive information. For example, a particular component 110 may be flagged as not approved for execution using sensitive information based on the particular component exposing an amount of information, or particular information of the sensitive information 104, during actual or hypothetical operation. For another example, the computer-readable program 102 as a whole may be flagged as approved for processing sensitive information with or without regard to any particular information.

In some embodiments, the information-leakage profile 130 may include an indication of information leakage of the components 110 and/or the computer-readable program 102. The information-leakage profile 130 may include a list of which internal variables of the components 110, and/or the computer-readable program 102, are susceptible to leakage during executing of the components 110, and/or the computer-readable program 102. Additionally or alternatively, the information-leakage profile 130 may include a list of which information of the sensitive information 104 is susceptible to leakage during execution of the components 110, and/or the computer-readable program 102, using the sensitive information 104.

Additionally or alternatively, the information-leakage profile 130 may include one or more approvals and/or disapprovals of one or more of the components 110, and/or the computer-readable program 102, for execution using sensitive information. For example, the information-leakage profile 130 may include information indicating that a particular component 110 or the computer-readable program 102 as a whole, is approved for execution using sensitive information. For another example, the information-leakage profile 130 may include information indicating that a particular component 110 is not approved for execution using sensitive information. Such a disapproval may be an alert to a software developer and/or automated software developing tool to modify one or more of: the disapproved component, how the disapproved component is used in the computer-readable program 102, and/or which sensitive information 104 is allowed to be accessed by the disapproved component.

In some embodiments, the information-leakage profile 130 may include a function for determining the information leakage of a computer-readable program 102 or of one or more components 110 of a computer-readable program 102. For example, the information-leakage identifier 120 may generate a function, included in the information-leakage profile 130, based on the computer-readable program 102. The function may take the sensitive information 104 as an input and identify information of the sensitive information 104 that may be susceptible to exposure by the computer-readable program 102 ("leaked sensitive information 132.")

In some embodiments, the leaked sensitive information 132 may be information that may be susceptible to being leaked by the computer-readable program 102. The leaked sensitive information 132 may be a subset of the sensitive information 104. In some embodiments, the leaked sensitive information 132 may be generated by the information-leakage profile 130. For example, the information-leakage profile 130 may include a function that may take the sensitive information 104 as an input and identify portions of the sensitive information 104 that may be leaked by the computer-readable program 102. In these or other embodiments, the leaked sensitive information 132 may be generated by the information-leakage identifier 120.

In some embodiments, the modified computer-readable program 140 may include one or more modifications made to the computer-readable program 102. Based on a determination that a particular computer-readable program 102, or particular component 110, is not approved for execution using sensitive information, the particular computer-readable program 102, or particular component 110, may be modified. For example, based on a determination that the computer-readable program 102 leaks information, the computer-readable program 102 may be modified. For another example, based on particular leaked sensitive information 132, a determination may be made that the computer-readable program 102 is to be modified. For example, the particular component 110 may include an insecure line of code that causes the potential leakage. The insecure line of code may be replaced with a secure line of code in the particular component 110 that eliminates or reduces the probability of leakage. As another example, a computer-readable program 102 that includes the particular component may be modified such that the way that the particular component accesses data is changed. For example, the computer-readable program 102 may be modified such that the particular component 110 does not access sensitive information 104, modified such that the order in which data is accessed is modified (e.g., randomized), modified such that the memory addresses in which data is stored is modified, etc. An example of modifying a component 110, will be given below with regard to FIG. 2C.

In some embodiments, the information-leakage identifier 120 may be configured to generate the modified computer-readable program 140 based on the analysis of the computer-readable program 102. For example, the information-leakage identifier 120 may be configured to generate the modified computer-readable program 140 based on the information-leakage profile 130. In some embodiments, the information-leakage identifier 120 may be configured to generate the modified computer-readable program 140 based on the leaked sensitive information 132. For example, the information-leakage profile 130 may include a function that may generate the leaked sensitive information 132, which may include information of the sensitive information 104 that may be exposed during the operation of the computer-readable program 102. The information-leakage identifier 120 may generate the modified computer-readable program 140 to reduce or change information included in the leaked sensitive information 132.

Figure 4:
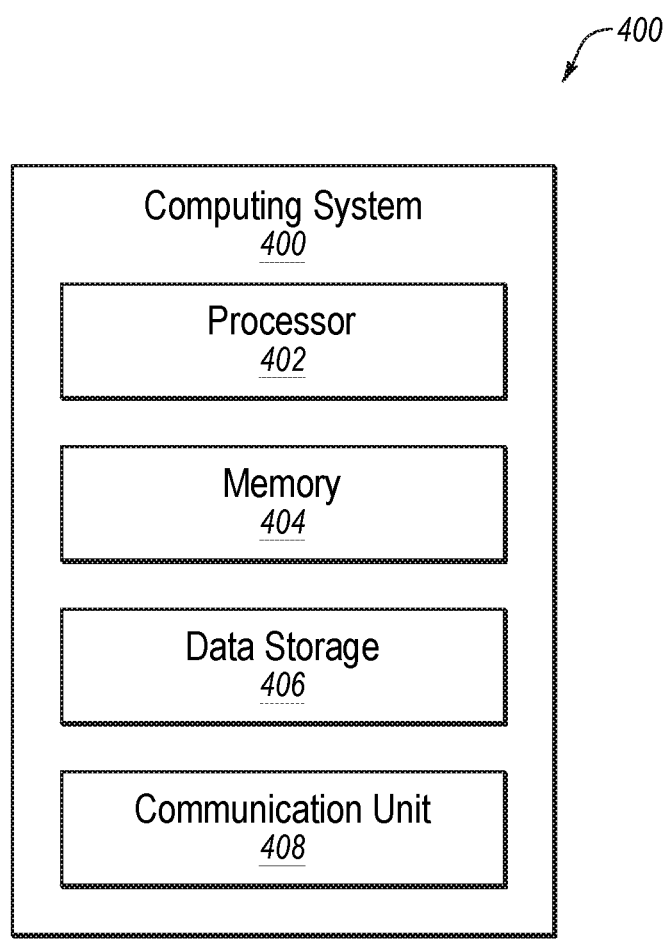
FIG. 4 is a block diagram of an example computing system, all according to at least one embodiment described in the present disclosure.

In some embodiments the information-leakage identifier 120 may include code and routines configured to enable a computing system to perform one or more operations related to identifying information leakage, such as the computing system 400 of FIG. 4. Additionally or alternatively, the information-leakage identifier 120 may be implemented using hardware including a processor, a microprocessor (e.g., to perform or control performance of one or more operations), a field-programmable gate array (FPGA), and/or an application-specific integrated circuit (ASIC), such as, for example, the processor 402 of FIG. 4. In some other instances, the information-leakage identifier 120 may be implemented using a combination of hardware and software. In the present disclosure, operations described as being performed by the information-leakage identifier 120 may include operations that the information-leakage identifier 120 may direct a system to perform.

Modifications, additions, or omissions may be made to the system 100 without departing from the scope of the present disclosure. For example, the sensitive information 104 may be part of or directly associated with the computer-readable program 102. In these or other embodiments, the system 100 may operate without any sensitive information 104 and may be configured to generate the information-leakage profile 130 and/or the modified computer-readable program 140 without reference to any sensitive information 104. As another example, the information-leakage identifier 120 may generate only one or the other of the information-leakage profile 130 and the modified computer-readable program 140. As another example, the information-leakage identifier 120 may generate the leaked sensitive information 132 directly, or as part of the information-leakage profile 130. As another example, the system 100 may not generate the leaked sensitive information 132 at all.

Figure 2A:
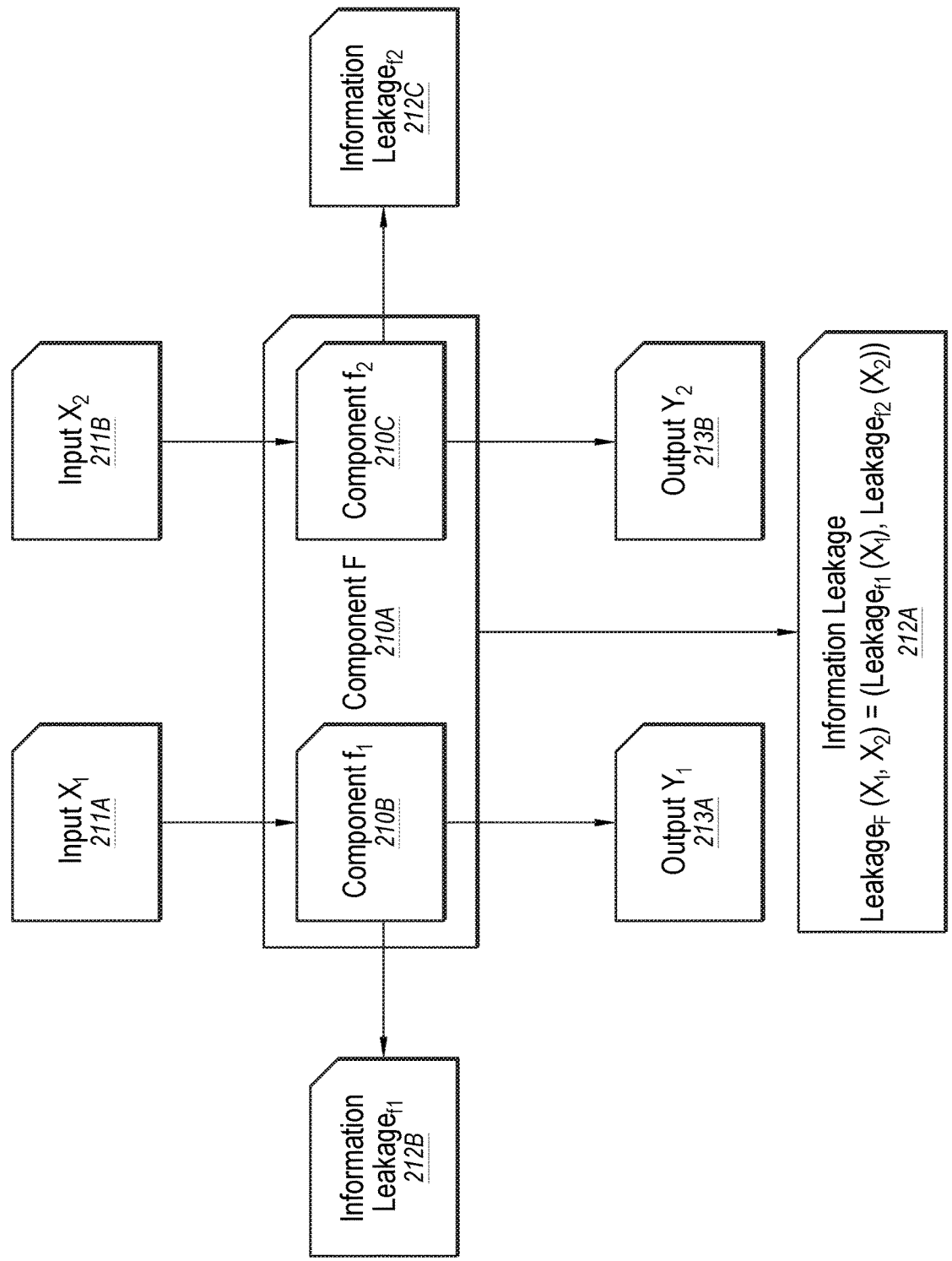
FIG. 2A is a block diagram of an example component including parallel composition.

FIG. 2A is a block diagram of an example component 210 including parallel composition; according to at least one embodiment described in the present disclosure. The parallel composition illustrated in FIG. 2A is one example of a relationship between components 210 of a computer-readable program.

Three components are illustrated in FIG. 2A: a first component 210A, a second component 210B, and a third component 210C, (collectively referred to as the components 210). The first component 210A may include the second component 210B and the third component 210C (e.g., the first component 210A may include a super-set of software code that includes the software code of the second component 210B and the software code of the third component 210C). Two inputs are illustrated in FIG. 2A: a first input 211A and a second input 211B (collectively referred to as the inputs 211). The first input 211A may represent an input of the second component 210B. The second input 211B may represent an input of the third component 210C. Three information leakages are illustrated in FIG. 2A: a first information leakage 212A, a second information leakage 212B, and a third information leakage 212C, (collectively referred to as the information leakages 212). The first information leakage 212A may represent the total information leaked by the first component 210A. The second information leakage 212B may represent information leaked by the second component 210B. The third information leakage 212C may represent information leaked by the third component 210C. Two outputs are illustrated in FIG. 2A: a first output 213A and a second output 213B (collectively referred to as the outputs 213). The first output 213A may represent an output of the second component 210B. The second output 213B may represent an output of the third component 210C. The number of components 210, inputs 211, information leakages 212, and/or outputs 213 may vary according to different implementations.

The relationship between the second component 210B and the third component 210C illustrated in FIG. 2A may include a parallel composition such that the first input 211A is independent of the second output 213B and the second input 211B is independent of the first output 213A. In such a case, the first information leakage 212A may include an independent combination of the second information leakage 212B and the third information leakage 212C.

In other words, if the second information leakage 212B is expressed as $\text{Leakage}_{f_1}(x_1)$, and the third information leakage 212C is expressed as $\text{Leakage}_{f_2}(x_2)$, then the first information leakage 212A could be expressed as $\text{Leakage}_F(x_1, x_2) = (\text{Leakage}_{f_1}(x_1), \text{Leakage}_{f_2}(x_2))$ Modifications, additions, or omissions may be made to the component 210A, the inputs 211, the information leakages 212, and/or the outputs 213 without departing from the scope of the present disclosure. For example, the first component 210A may include any number of components 210 arranged in parallel and the first information leakage 212A would consequently include an independent combination of all of the information leakages 212 of each of the components 210.

Figure 2B:
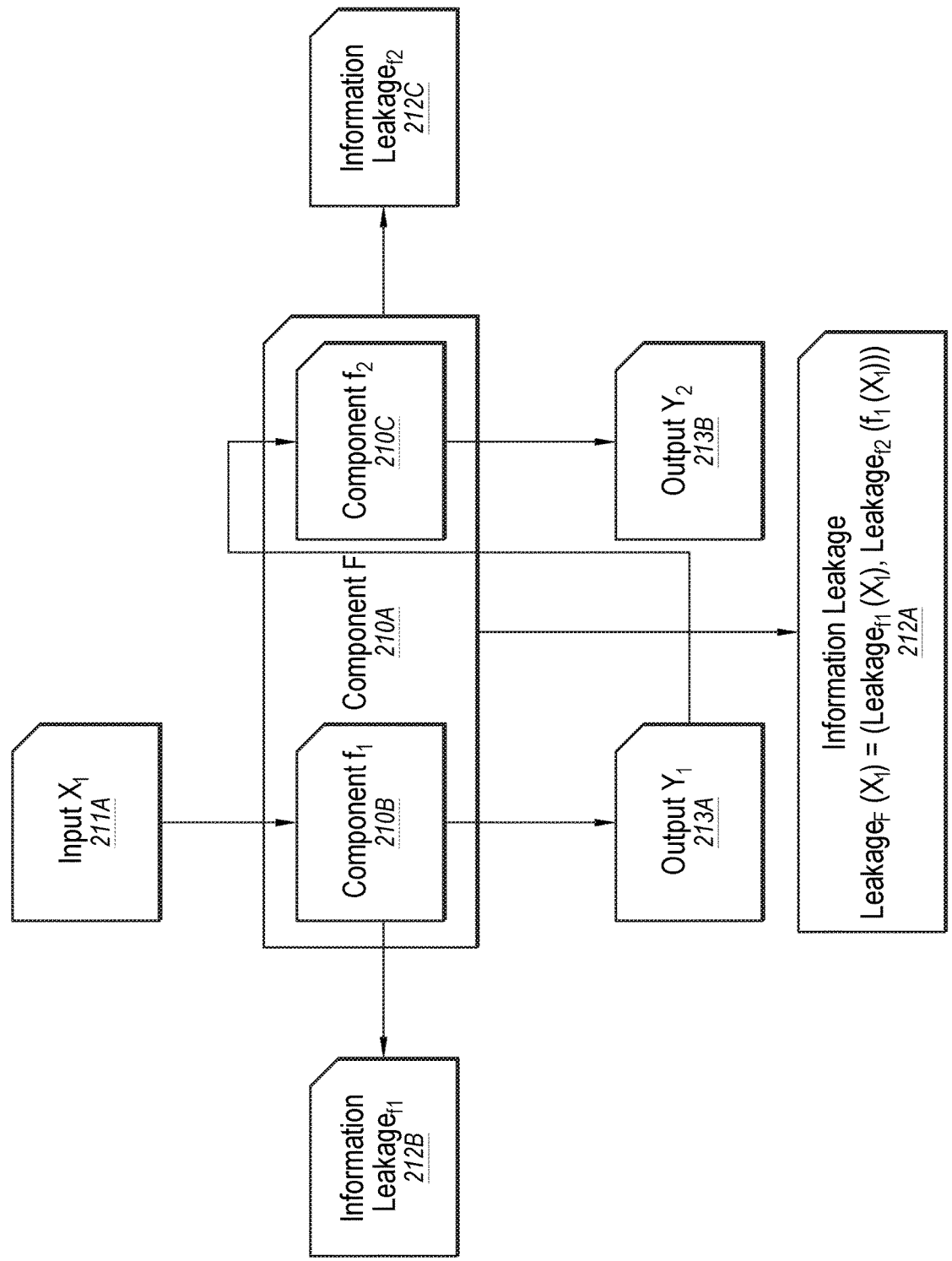
FIG. 2B is a block diagram of an example component including sequential composition.

FIG. 2B is a block diagram of an example component including sequential composition; according to at least one embodiment described in the present disclosure. The sequential composition illustrated in FIG. 2B is another example of a relationship between components 210 of a computer-readable program.

One or more of the components 210, the inputs 211, the outputs 213, and/or the information leakages 212 of FIG. 2B may be the same as or similar to the components 210, the inputs 211, the outputs 213, and/or the information leakages 212 respectively described above with regard to FIG. 2A. However, in FIG. 2B the third component 210C may use the first output 213A as its input.

The relationship between the second component 210B and the third component 210C as illustrate in FIG. 2B may include a sequential composition such that the first output 213A is used by the third component 210C as its input. In such a case, the first information leakage 212A may include the second information leakage 212B and an information leakage based on using first output 213A as the input to the third component 210C. In other words, if the second information leakage 212B is expressed as (Leakage$_{f_1}$(x$_1$), the third information leakage 212C is expressed as (Leakage$_{f_2}$(x$_2$), and the first output 213A is expressed as f$_1$(x$_1$), then the first information leakage 212A could be expressed as Leakage$_F$(x$_1$)=(Leakage$_{f_1}$(x$_1$), Leakage$_{f_2}$(f$_1$(x$_1$)))

Modifications, additions, or omissions may be made to the component 210A, the inputs 211, the information leakages 212, and/or the outputs 213 without departing from the scope of the present disclosure. For example, the first component 210A may include any number of components 210 arranged sequentially and the information leakages 212A would consequently include a dependent nesting of each of the information leakages. However, in such a case, the first component 210A may be divided into smaller components such that each components only includes one sequential relationship.

Figure 2C:
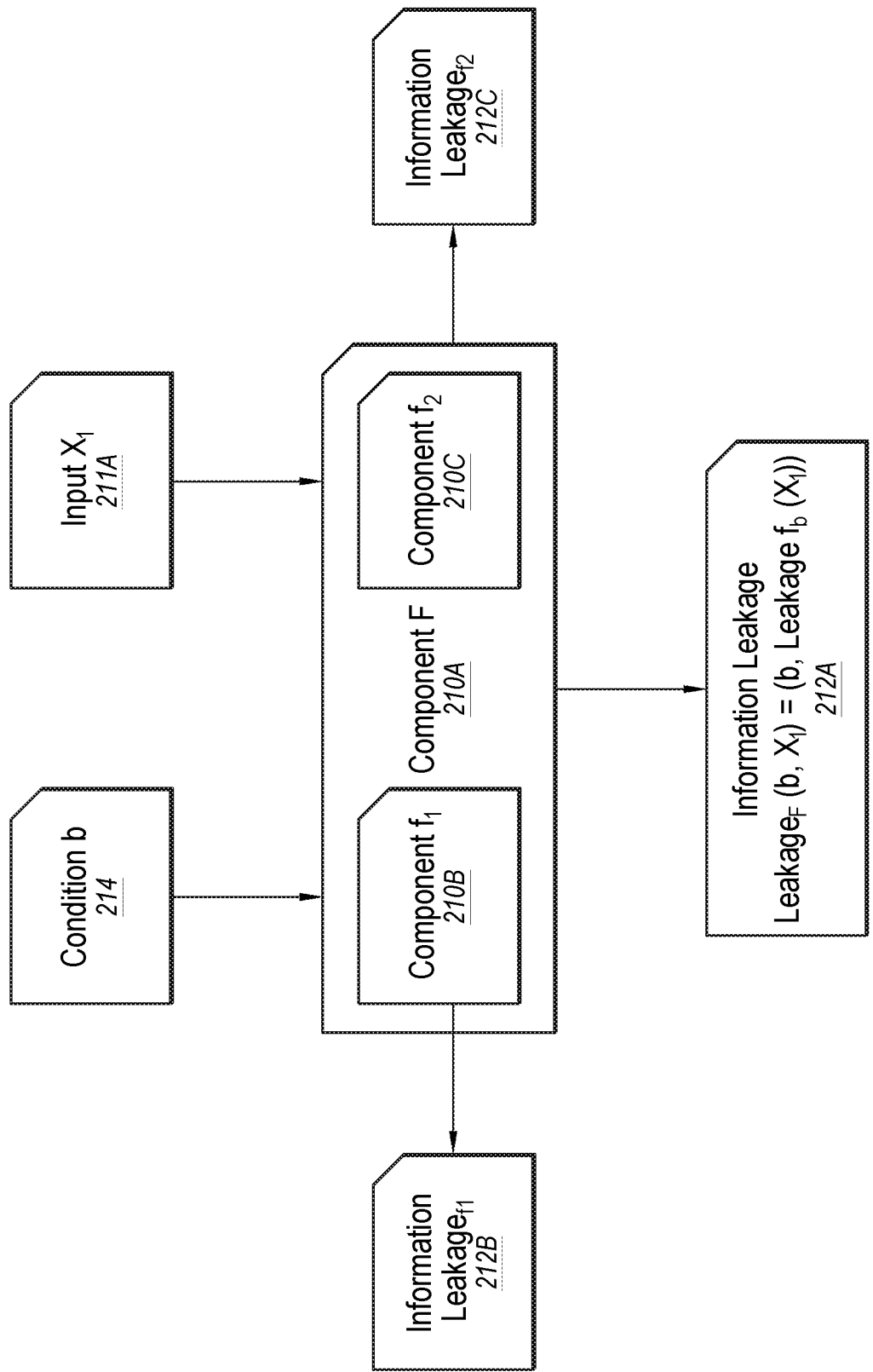
FIG. 2C is a block diagram of an example component including a conditional branch.

FIG. 2C is a block diagram of an example component including a conditional branch; according to at least one embodiment described in the present disclosure. The conditional branch composition illustrated in FIG. 2C is another example of a relationship between components 210 of a computer-readable program. For example, one component may be selected over another based on a Boolean value b associated with a condition 214 (e.g., is b true or false).

One or more of the components 210, the inputs 211, and/or the information leakages 212 of FIG. 2C may be the same as or similar to the components 210, the inputs 211, and/or the information leakages 212 respectively described above with regard to FIG. 2A. Additionally, FIG. 2C includes the condition 214.

The first component 210A as illustrated in FIG. 2C may include a conditional branch composition such that the first component 210A may be configured such that in response to the satisfaction of the condition 214 the second component 210B is executed and in response to the dissatisfaction of the condition 214 the third component 210C is executed (e.g., if b is false, the second component 210B is executed and if b is true, the third component 210C is executed). In such a case, the first information leakage 212A may include whether or not the condition 214 is satisfied. For example, it may be observed from the outside that a certain block of memory is accessed that is associated with the second component 210B, and thus, it may be determined by an outside observer that the condition b is false. Additionally or alternatively, the first information leakage 212A may include one of the second information leakage 212B or the third information leakage 212C. In other words, if the second information leakage 212B is expressed as (Leakage$_{f_1}$(x$_1$), the third information leakage 212C is expressed as (Leakage$_{f_2}$(x$_2$), and whether or not the condition 214 is satisfied is expressed as "b," then the first information leakage 212A could be expressed as Leakage$_F$(b, x$_1$)=(b, Leakage$_{f_b}$(x$_1$)).

As an example of modifying a component to reduce information leakage, in a case where the first component 210A include a conditional branch, the first component 210A may be modified such that the first component 210A avoids or reduces exposure of the satisfaction of the condition 214(b). For example, one or more of the second component 210B and the third component 210C may be padded with instructions that may not cause any operations such that both of the second component 210B and the third component 210C are equal in size such that a retrieval or execution of the second component 210B and the third component 210C is indistinguishable from an outside observer based merely on size. As another example, the locations in memory of the second component 210B and the third component 210C may be obliviously shuffled in memory, such as locating the components 210B and/or 210C at various random locations. In these and other embodiments, the result may be that when the first component 210A is executed, to an observer, the memory access patterns may be indistinguishable whether the second component 210B or the third component 210C is called. As such, the satisfaction of the condition 214 (e.g., whether b is true or false) may not be exposed.

Modifications, additions, or omissions may be made to the component 210A, the inputs 211, the information leakages 212, and/or the condition 214 without departing from the scope of the present disclosure. For example, the first component 210A may depend on more than one condition 214. However, in such a case, the first component 210A may be divided into smaller components such that each of the sub-components may include a single conditional branch.

Figure 2D:
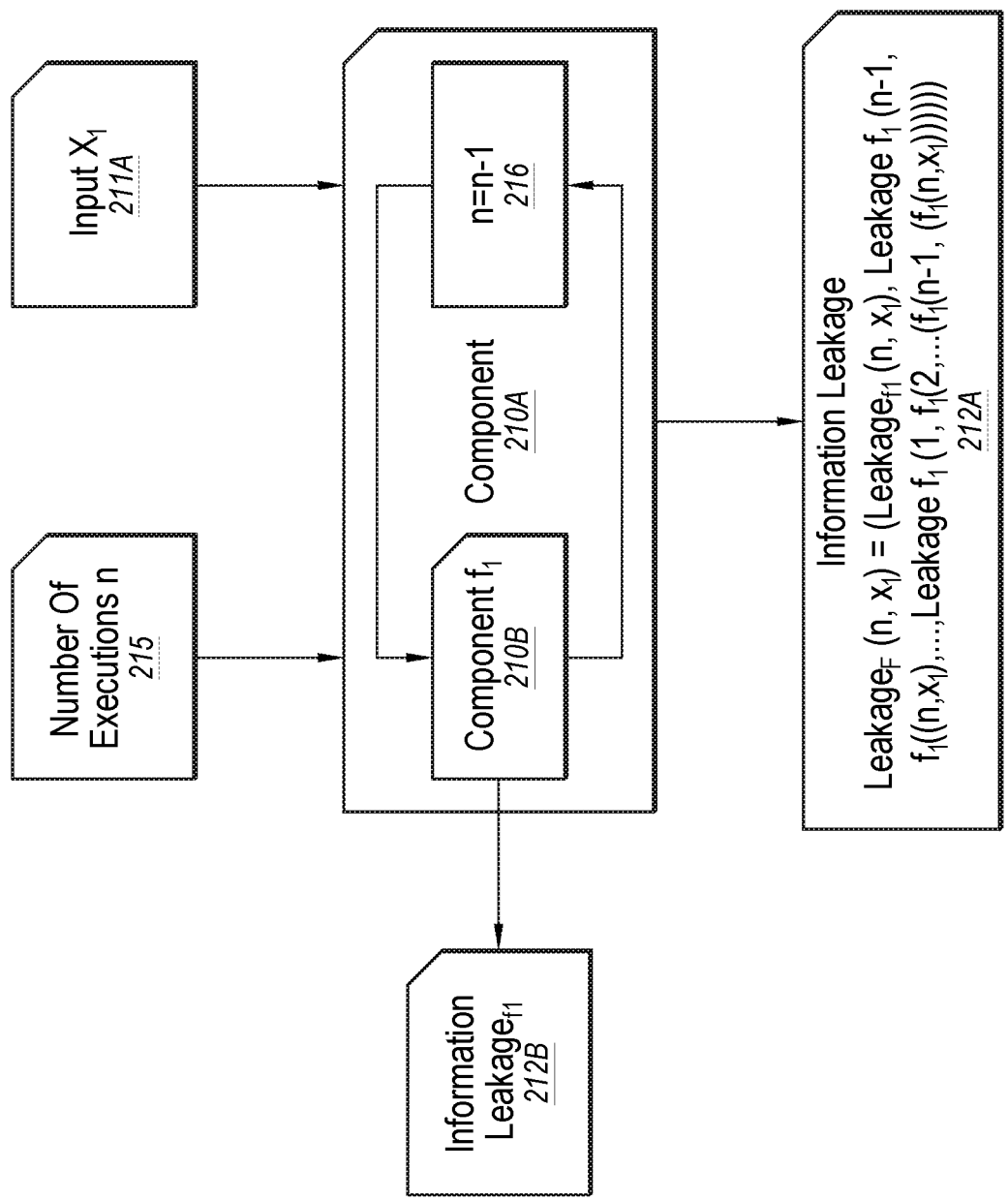
FIG. 2D is a block diagram of an example component including primitive recursion.

FIG. 2D is a block diagram of an example component including primitive recursion; according to at least one embodiment described in the present disclosure. The primitive recursion composition illustrated in FIG. 2D is another example of a relationship between components 210 of a computer-readable program, and is illustrated as a loop through the component 210B a certain number of times (n).

One or more of the components 210, the inputs 211, and/or the information leakages 212 of FIG. 2D may be the same as or similar to the components 210, the inputs 211, and/or the information leakages 212 respectively described above with regard to FIG. 2A. Additionally, FIG. 2D includes the number of executions 215 and a decrementor 216. The second component 210B and the decrementor 216 may be configured such that the second component 210B may be repeated n times.

The first component 210A as illustrated in FIG. 2D may include primitive recursion such that the second component 210B is executed according to the number of executions 215. In such an embodiment, the first information leakage 212A may include the number of executions 215 n. Additionally or alternatively, the first information leakage 212A may include the second information leakage 212B. Additionally or alternatively the first information leakage 212A may include additional information leakage for each of the repeated executions of second component 210B. In other words, if the second information leakage 212B is expressed as (Leakage$_{f_1}$(x$_1$)), and the number of executions 215 is expressed as "n," then the first information leakage 212A may be expressed as Leakage$_F$(n, x$_1$)=(Leakage$_{f_1}$(n, x$_1$), Leakage$_{f_1}$(n−1, f$_1$(n, x$_1$), . . . , Leakage$_{f_1}$(1, f$_1$(2, . . . (f$_1$(n−1, (f$_1$(n, x$_1$))))))).

Modifications, additions, or omissions may be made to the component 210A, the inputs 211, the information leakages 212, and/or the number of executions 215 without departing from the scope of the present disclosure. For example, the first component 210A may depend on more than one number of executions 215, and/or more than one component 210 of the first component 210A may depend on more than one number of executions 215. However, in such a case, the first component 210A may be divided into smaller components such that each components only includes one component depending on a number of executions 215. In these or other embodiments the first component 210A may include only one component, such as, for example, the second component 210B.

Figure 3:
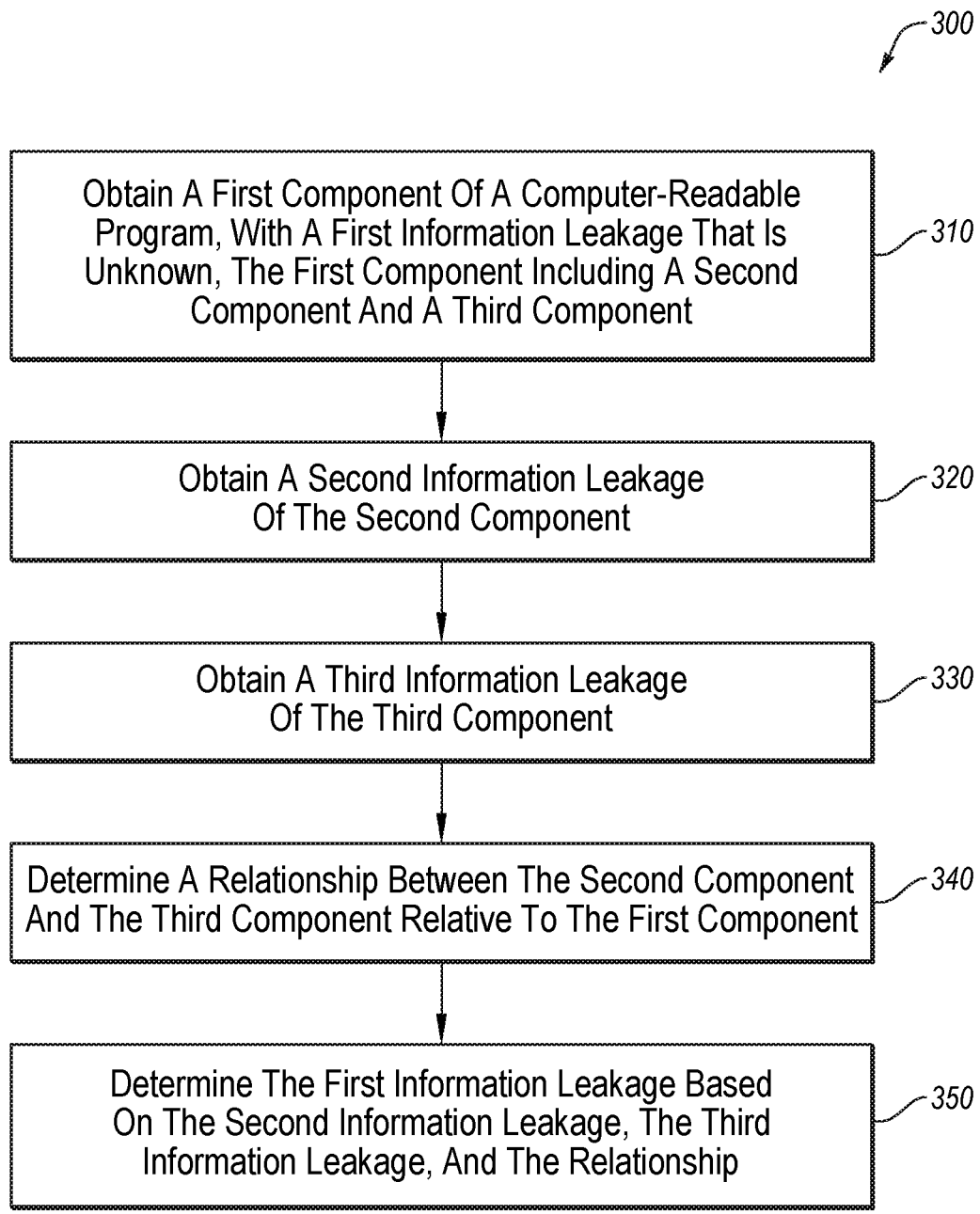
FIG. 3 is a flow chart of an example process for determining information leakage of computer-readable programs.

FIG. 3 is a flow chart of an example process 300 for determining information leakage of computer-readable programs, according to at least one embodiment described in the present disclosure. In some embodiments, one or more of the operations associated with the process 300 may be performed by the system 100 of FIG. 1. The process 300 may be performed by any suitable system, apparatus, or device. For example, the computing system 400 of FIG. 4 may perform one or more of the operations associated with the process 300. Although illustrated with discrete blocks, the steps and operations associated with one or more of the blocks of the process 300 may be divided into additional blocks, combined into fewer blocks, or eliminated, depending on the desired implementation.

At block 310, a first component of a computer-readable program may be obtained. The first component may include one or more executable instructions, lines of code, etc. to perform a set of tasks. The first component may have a first information leakage that may be unknown. The first component may include a second component and a third component. The first component 210A of FIGS. 2A-D may be an example of the first component. The first component may be a component of a computer-readable program, such as, for example, the computer-readable program 102 of FIG. 1.

At bock 320 a second information leakage of the second component may be obtained. The second information leakage may be a quantity, a variable of the second component, a memory address of the second component, a number of times the second component is executed, etc. or other information relative to sensitive information that may be used during a hypothetical or actual execution of the computer-readable program (e.g., the sensitive information 104 of FIG. 1).

At block 330 a third information leakage of the third component may be obtained. The third information leakage may be a quantity, a variable of the third component, a memory address of the third component, a number of times the third component is executed, etc. or other information relative to sensitive information that may be used during a hypothetical or actual execution of the computer-readable program (e.g., the sensitive information 104 of FIG. 1).

At block 340 a relationship between the second component and the third component relative to the first component may be determined. The parallel composition of FIG. 2A, the sequential composition of FIG. 2B, the conditional branch of FIG. 2C and/or primitive recursion of FIG. 2D may be examples of the relationship between the second component and the third component relative to the first component. In some embodiments, the relationship may be determined by comparing the second component and the third component, relative to the first component, to one or more common code patterns. Additionally or alternatively the relationship may be determined by analyzing code of the components. For example, an "if" and "then" may indicate a branch relationship.

At block 350, the first information leakage may be determined based on the second information leakage, the third information leakage, and the relationship. For example, in the case of parallel composition, the first information leakage may include an independent combination of the second information leakage and the third information leakage. As another example, for sequential composition, the first information leakage may include the second information leakage and an information leakage based on the third component using an output of the second component as an input. As a further example, for a conditional branch, the first information leakage 212A may include whether or not the branch condition is satisfied. For example, in the case of primitive recursion, the first information leakage may include the number of times executions one of the components is executed.

In some embodiments, the process 300 may be repeated a number of times as part of another process or may include other steps not illustrated. For example, the process 300 may include obtaining a computer-readable program and dividing the computer-readable program into multiple components. As another example, the process 300 may attempt to obtain or determine an information leakage for each of the components. If the process 300 is unable to obtain or determine an information leakage for each of the components, the process 300 may recursively subdivide each of the components into subcomponents. At each recursive subdivision, the process 300 may attempt to obtain an information leakage for each of the subcomponents. If the process 300 is unable to obtain or determine an information leakage for each of the subcomponents, the process 300 may further recursively subdivide each of the subcomponents. If the process 300 is able to obtain or determine an information leakage for each of the subcomponents, the process may use a process similar to or the same as the process 300 as illustrated in FIG. 3 recursively to aggregate the leakage of each of the subcomponents to determine an information leakage of the computer-readable program.

For example, at the level of recursion at which the process 300 is able to obtain or determine an information leakage for each subcomponent, the process 300 may use the process 300 as illustrated in FIG. 3 to determine the aggregate information leakage of the subcomponents. The process 300 may then go up a level of recursion and use the process 300 as illustrated in FIG. 3 again to determine an aggregate information leakage of the aggregate information leakages at the next level of recursion. The process may be recursively repeated until an aggregate leakage of the entire computer-readable program is determined.

One skilled in the art will appreciate that, for the system 100, and the process 300 and other processes and methods disclosed herein, the functions performed in the processes and methods may be implemented in differing order. Furthermore, the outlined steps and actions are only provided as examples, and some of the steps and actions may be optional, combined into fewer steps and actions, or expanded into additional steps and actions without detracting from the essence of the disclosed embodiments.

FIG. 4 is a block diagram of an example computing system 400, which may be according to at least one embodiment described in the present disclosure. As illustrated in FIG. 4, the computing system 400 may include a processor 402, a memory 404, a data storage 406, and a communication unit 408.

One or more components of the systems 100 of FIG. 1 and/or the process 300 of FIG. 3 may be implemented on a computing system such as the computing system 400 of FIG. 4. For example, computer-readable program 102, the sensitive information 104, the components 110, the information-leakage profile 130, and/or the modified computer-readable program 140 may be stored in the memory 404 and/or the data storage 406. The processor 402 may perform one or more operations related to the information-leakage identifier 120. Additionally or alternatively, the computer-readable program 102, the sensitive information 104, the components 110, the information-leakage profile 130, and/or the modified computer-readable program 140 may be received or communicated by the communication unit 408.

Generally, the processor 402 may include any suitable special-purpose or general-purpose computer, computing entity, or processing device including various computer hardware or software modules and may be configured to execute instructions stored on any applicable computer-readable storage media. For example, the processor 402 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 4, it is understood that the processor 402 may include any number of processors distributed across any number of network or physical locations that are configured to perform individually or collectively any number of operations described herein. In some embodiments, the processor 402 may interpret and/or execute program instructions and/or process data stored in the memory 404, the data storage 406, or the memory 404 and the data storage 406. In some embodiments, the processor 402 may fetch program instructions from the data storage 406 and load the program instructions in the memory 404. After the program instructions are loaded into the memory 404, the processor 402 may execute the program instructions, such as instructions to perform one or more operations described with respect to the system 100 of FIG. 1 respectively.

The memory 404 and the data storage 406 may include computer-readable storage media or one or more computer-readable storage mediums for carrying or having computer-executable instructions or data structures stored thereon. Such computer-readable storage media may be any available media that may be accessed by a general-purpose or special-purpose computer, such as the processor 402. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 402 to perform a certain operation or group of operations. In these and other embodiments, the term "non-transitory" as explained herein should be construed to exclude only those types of transitory media that were found to fall outside the scope of patentable subject matter in the Federal Circuit decision of *In re Nuijten,* 500 F.3d 1346 (Fed. Cir. 4007). Combinations of the above may also be included within the scope of computer-readable media.

The communication unit 408 may be configured to receive the computer-readable program 102, the sensitive information 104, the components 110, the information-leakage profile 130, and/or the modified computer-readable program 140 and to provide the computer-readable program 102, the sensitive information 104, the components 110, the information-leakage profile 130, and/or the modified computer-readable program 140 to the data storage 406. The communication unit 408 may include any device, system, component, or collection of components configured to allow or facilitate communication between the computing system 400 and a network. For example, the communication unit 408 may include, without limitation, a modem, a network card (wireless or wired), an infrared communication device, an optical communication device, a wireless communication device (such as an antenna), and/or chipset (such as a Bluetooth device, an 802.6 device (e.g. Metropolitan Area Network (MAN)), a Wi-Fi device, a WiMAX device, cellular communication facilities, etc.), and/or the like. The communication unit 408 may permit data to be exchanged with any such as a cellular network, a Wi-Fi network, a MAN, an optical network, etc., to name a few examples, and/or any other devices described in the present disclosure, including remote devices.

Modifications, additions, or omissions may be made to the computing system 400 without departing from the scope of the present disclosure. For example, the data storage 406 may be located in multiple locations and accessed by the processor 402 through a network.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads).

While some of the system and methods described herein are generally described as being implemented in software (stored on and/or executed by general-purpose hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B." Additionally, use of the term "and/or" in some places does not mean that the term "or" should be understood to only include either of the terms as opposed to including the possibility of both terms.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
    obtaining a first component of a computer-readable program, the first component having a first information leakage that is unknown, the first component being comprised of a second component with a first input and a first output, a third component with a second input and a second output, a fourth component, and a fifth component;
    obtaining a second information leakage of the second component;
    obtaining a third information leakage of the third component;
    obtaining a fourth information leakage of the fourth component;
    obtaining a fifth information leakage of the fifth component;
    determining a first relationship between the second component and the third component as the second and third components relate to each other within the first component, the first relationship including a parallel composition such that the first input is independent of the second output and the second input is independent of the first output;
    determining a second relationship between the fourth component and the fifth component as the fourth and fifth components relate to each other within the first component, the second relationship including at least one of a sequential composition, a primitive recursion, and a conditional branch; and
    determining the first information leakage based on a combination of a first value and a second value, the first value determined using a first mathematical process based on the second information leakage, the third information leakage, and the first relationship between the second and third components, the first mathematical process including independently combining the second information leakage and the third information leakage, the second value determined using a second mathematical process based on the fourth information leakage, the fifth information leakage, and the second relationship between the fourth and fifth components, the first mathematical process associated with the first relationship, the second mathematical process associated with the second relationship, and the first mathematical process different form the second mathematical process.

2. The method of claim 1, further comprising in response to the determining the first information leakage, reducing the first information leakage by replacing an insecure line of code in the first component with one or more secure lines of code in the first component, the one or more secure lines of code having less information leakage than the insecure line of code.

3. The method of claim 1, further comprising in response to the determining the first information leakage, flagging the first component as insecure to indicate that information accessed by the first component is at risk of exposure.

4. The method of claim 1, further comprising:
    in response to the determining the first information leakage, determining whether the computer-readable program leaks sensitive information, and
    in response to determining that the computer-readable program leaks the sensitive information flagging the computer-readable program as not approved for execution using the sensitive information.

5. The method of claim 1, further comprising:
executing the computer-readable program using particular information; and
in response to the determining the first information leakage, determining whether the particular information was exposed during the execution of the computer-readable program.

6. The method of claim 1, wherein:
the fourth component has a fourth input and a fourth output,
the fifth component has a fifth input and a fifth output,
the second relationship includes the sequential composition such that the fourth output is used by the fifth component as the fifth input, and
determining the first information leakage includes combining the second fourth information leakage and the fifth information leakage of the fifth component using the fourth output as the fifth input.

7. The method of claim 1, wherein:
the computer-readable program is configured such that the second relationship includes the conditional branch such that in response to satisfaction of a condition, the fourth component is executed, and in response to dissatisfaction of the condition the fifth component is executed, and
determining the first information leakage includes including whether the condition is satisfied in the first information leakage.

8. The method of claim 7, further comprising:
in response to the first information leakage including whether the condition is satisfied:
padding the fourth component such that it is the same size in memory as the fifth component; and
obliviously shuffling locations of instruction blocks of the fourth component and the fifth component in memory.

9. The method of claim 1, wherein:
the second relationship includes the primitive recursion such that the fourth component is executed a number of times before the fifth component is executed, and
determining the first information leakage includes including the number of times the fourth component is executed in the first information leakage.

10. The method of claim 1, wherein the second component is comprised of a sixth component and a seventh component; and obtaining the second information leakage comprises:
obtaining a sixth information leakage of the sixth component;
obtaining a seventh information leakage of the seventh component;
determining a third relationship between the fourth component and the fifth component relative to the second component; and
determining the second information leakage based on the sixth information leakage, the seventh information leakage, and the third relationship.

11. The method of claim 1, further comprising:
obtaining the computer-readable program;
dividing the computer-readable program into a plurality of components including the second component and the third component;
recursively subdividing each of the plurality of components into subcomponents;
obtaining a leakage for each of the plurality of subcomponents; and
determining an aggregate leakage of the computer-readable program based on the leakage of each of the subcomponents.

12. At least one non-transitory computer-readable media configured to store one or more instructions that when executed by at least one processor cause or direct a system to perform operations, the operations comprising:
obtaining a first component of a computer-readable program, the first component having a first information leakage that is unknown, the first component being comprised of a second component, a third component, a fourth component, and a fifth component;
obtaining a second information leakage of the second component;
obtaining a third information leakage of the third component;
obtaining a fourth information leakage of the fourth component;
obtaining a fifth information leakage of the fifth component;
determining a first relationship between the second component and the third component as the second and third components relate to each other within the first component, the first relationship including a conditional branch;
determining a second relationship between the fourth component and the fifth component as the fourth and fifth components relate to each other within the first component, the second relationship including at least one of a parallel composition, a sequential composition, and a primitive recursion; and
determining the first information leakage based on a combination of a first value and a second value, the first value determined using a first mathematical process based on the second information leakage, the third information leakage, and the first relationship between the second and third components, the second value determined using a second mathematical process based on the fourth information leakage, the fifth information leakage, and the second relationship between the fourth and fifth components, the first mathematical process associated with the first relationship, the second mathematical process associated with the second relationship, and the first mathematical process different form the second mathematical process,
wherein the first mathematical process comprises:
padding the second component such that it is the same size in memory as the third component; and
obliviously shuffling locations of instruction blocks of the second component and the third component in memory.

13. The non-transitory computer-readable media of claim 12, wherein the operations further comprise in response to the determining the first information leakage, reducing the first information leakage by replacing an insecure line of code in the first component with one or more secure lines of code in the first component, the one or more secure lines of code having less information leakage than the insecure line of code.

14. The non-transitory computer-readable media of claim 12, wherein the operations further comprise in response to the determining the first information leakage, flagging the first component as insecure to indicate that information accessed by the first component is at risk of exposure.

15. The non-transitory computer-readable media of claim 12, wherein the operations further comprise:
- in response to the determining the first information leakage, determining whether the computer-readable program leaks sensitive information, and
- in response to determining that the computer-readable program leaks the sensitive information flagging the computer-readable program as not approved for execution using the sensitive information.

16. A system including:
one or more processors; and
one or more non-transitory computer-readable media containing instructions that, when executed by the one or more processors are configured to cause the system to perform operations comprising:
- obtaining a first component of a computer-readable program, the first component having a first information leakage that is unknown, the first component being comprised of a second component with a first input and a first output, a third component with a second input and a second output, a fourth component, and a fifth component;
- obtaining a second information leakage of the second component;
- obtaining a third information leakage of the third component;
- obtaining a fourth information leakage of the fourth component;
- obtaining a fifth information leakage of the fifth component;
- determining a first relationship between the second component and the third component as the second and third components relate to each other within the first component, the first relationship including of a parallel composition such that the first input is independent of the second output and the second input is independent of the first output;
- determining a second relationship between the fourth component and the fifth component as the fourth and fifth components relate to each other within the first component, the second relationship including at least one of a sequential composition, a primitive recursion, and a conditional branch; and
- determining the first information leakage based on a combination of a first value and a second value, the first value determined using a first mathematical process based on the second information leakage, the third information leakage, and the first relationship between the second and third components, the first mathematical process including independently combining the second information leakage and the third information leakage, the second value determined using a second mathematical process based on the fourth information leakage, the fifth information leakage, and the second relationship between the fourth and fifth components, the first mathematical process associated with the first relationship, the second mathematical process associated with the second relationship, and the first mathematical process different form the second mathematical process.

17. The system of claim 16, wherein the operations further comprise in response to the determining the first information leakage, reducing the first information leakage by replacing an insecure line of code in the first component with one or more secure lines of code in the first component, the one or more secure lines of code having less information leakage than the insecure line of code.

18. The system of claim 16, wherein the operations further comprise in response to the determining the first information leakage, flagging the first component as insecure to indicate that information accessed by the first component is at risk of exposure.

19. The system of claim 16, wherein the operations further comprise:
- in response to the determining the first information leakage, determining whether the computer-readable program leaks sensitive information, and
- in response to determining that the computer-readable program leaks the sensitive information flagging the computer-readable program as not approved for execution using the sensitive information.

* * * * *